No. 776,595.

Patented December 6, 1904.

UNITED STATES PATENT OFFICE.

HENRY C. JOEHNK, OF LYONS, IOWA, AND HERMANN WIESE, OF MOUNT CLEMENS, MICHIGAN; SAID WIESE ASSIGNOR TO SAID JOEHNK.

STOCK-FOOD.

SPECIFICATION forming part of Letters Patent No. 776,595, dated December 6, 1904.

Application filed June 10, 1903. Renewed October 20, 1904. Serial No. 229,243. (No specimens.)

*To all whom it may concern:*

Be it known that we, HENRY C. JOEHNK, a citizen of the United States, residing at Lyons, in the county of Clinton and State of Iowa, and HERMANN WIESE, a subject of the Emperor of Germany, residing at Mount Clemens, in the county of Macomb and State of Michigan, have invented certain new and useful Improvements in Stock-Foods, of which the following is a specification.

This invention has for its object to provide a food of a highly nutritious and easily-digested character for horses, cattle, sheep, and hogs.

The essential ingredients employed are molasses and peat muck; but these are preferably mixed with palm-seed meal and also generally with bran or the like, linseed-oil cake or its equivalent, and malt refuse or its equivalent, all of which are compounded in the manner hereinafter explained and in substantially the proportions specified. The peat muck should contain a large percentage of vegetable matter, and muck of the proper growth or character may be easily obtained at small expense. Instead of bran, middlings may be employed with equally good results, and instead of the by-product of the manufacture of linseed-oil, rape-oil cake or any other substance of the same character may be employed. The malt refuse is a by-product of beer manufacture and may be obtained from breweries, but in lieu thereof beet-pulp, the residue from the manufacture of beet-sugar, or chopped hay or straw may be used. Of the essential ingredients the proportions are about as follows: molasses, twelve parts; peat muck, four parts, and of the other substances, bran, two parts; palm-seed meal, two parts; linseed-oil cake, two parts, and malt refuse, two parts.

In compounding the stock-food the molasses is first heated in any suitable receptacle, after which it is mixed with the peat muck, the latter having been dried to extract the moisture therefrom. The resultant is then put into a mixing-machine and kept in a heated state by means of steam or other heating medium and the other ingredients then added, the whole being subjected to heat and agitation, so as to thoroughly mix the same. After this step in the process of compounding the food the latter is dried and is ready for use after cooling. The completed product contains, depending on the grade of the ingredients used, about forty-five to sixty per cent. of sugar and has been found to be exceedingly nutritious and easily digestible and very palatable to stock. Preferably it is used in feeding without corn or other cereal grains, but may be used with hay. Being in a loose form, it may be put up in bags or sold in bulk.

It is to be understood that the proportions may be greatly varied, and such variation will depend upon the grade or quality of the ingredients employed. It is also to be understood that we do not restrict ourselves to the exact ingredients specified in the claims, but that the latter are intended to comprehend the equivalents thereof.

Having described our invention, what we claim is—

1. A stock-food consisting of molasses, peat muck, bran, palm-seed meal, linseed-meal cake and malt refuse, compounded in the manner and in substantially the proportions specified.

2. A stock-food consisting of the following ingredients and proportions: molasses, twelve parts, peat muck, four parts, bran, two parts, palm-seed meal, two parts, linseed-oil cake, two parts, and malt refuse, two parts, compounded in the manner substantially as specified.

In testimony whereof we affix our signatures each in presence of two witnesses.

HENRY C. JOEHNK.
HERMANN WIESE.

Witnesses to the signature of Henry C. Joehnk:
ARTHUR B. SEIBOLD,
R. K. GUSTAFSON.

Witnesses to the signature of Hermann Wiese:
W. T. MOXON,
Mrs. CHARLES A. STEINWACHS.